United States Patent Office 3,328,394
Patented June 27, 1967

3,328,394
PROCESS FOR PRODUCING ω-LACTAMS
Giuseppe Ribaldone, Gallarate, Varese, Franco Smai, Novate Milanese, Milan, and Giampiero Borsotti, Milan, Italy, assignors to Montecatini Edison S.p.A., Milan, Italy
No Drawing. Filed Aug. 6, 1964, Ser. No. 388,015
Claims priority, application Italy, Aug. 9, 1963, 16,867/63
14 Claims. (Cl. 260—239.3)

ABSTRACT OF THE DISCLOSURE

Process for producing ω-lactams such as caprolactam by reacting cycloalkanecarboxylic acids (e.g. cyclohexanecarboxylic acid) with molecular nitrosyl chlorosulfonate having the formula $ClSO_3NO$. The reaction is carried out by combining the molecular nitrosyl chlorosulfonate with the cycloalkanecarboxylic acid in a liquid phase at a temperature between 30° C. and 150° C. with the cycloalkanecarboxylic acid which has a ring containing from 4 to 12 carbon atoms and may be dissolved in aliphatic, cycloaliphatic and chlorinated aliphatic hydrocarbons and nitroparaffins, the molar ratio of the cycloalkane to the carboxylic acid being substantially between 0.5 and 2.

Our present invention relates to a process for producing ω-lactams and, more particularly, to a process for producing such lactams from cycloalkanecarboxylic acids.

It is a common practice in the production of ω-lactams, which can be generally characterized by the formula:

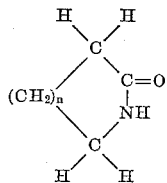

(wherein n is an integer), to cyclize amino-acids and produce the cyclic amide corresponding thereto. Such cyclic amides or lactams find considerable use in the production of polyamide synthetic resins (e.g. of the nylon type) for fibers, films, sheets and molded bodies. Another method of producing lactams is by the treatment of a cycloalkanecarboxylic acid with a nitrosating agent such as nitrosyl hydrogen sulfate, nitrosyl chloride or gases containing nitrogen oxides and, especially, nitrous oxide. In order to accelerate the reaction, it has been the practice to employ the nitrosating agent in the presence of sulfuric acid, sulfur trioxide or its polymers, and/or oleum $(H_2SO_4 \cdot SO_3)$ This reaction system can be used to produce caprolactam by reacting cyclohexanecarboxylic acid with nitrosyl hydrogen sulfate in the presence of sulfur trioxide and a solvent, especially a nitroparaffin. For the purposes of the present invention, an ω-lactam will be defined as a cyclic amide having the general formula given above wherein the amide group —CO—NH— connects two proximal carbon atoms which may also be considered at opposite ends of a chain regardless of the number of carbon atoms n between the two carbon atoms bearing the amide group, the amide group thus joining the two carbon atoms of the cycloalkane which were originally beta to the carboxylic-acid group. All of these previous methods of producing ω-lactams have been characterized by the formation or the presence of sulfuric acid or sulfur trioxide in considerable quantity so that the reaction involves both a substantial consumption of sulfuric acid, oleum and/or sulfur trioxide and a substantially equivalent consumption of alkali to neutralize the acidity corresponding to the total acid present. The alkali may be ammonia or an alkali metal hydroxide so that, upon neutralization, considerable quantities of the corresponding sulfate salt is produced. The excess acid and the large quantities of alkali increase the total volume of the mass from which the desired lactam is to be removed, thereby increasing the problem of extraction. Moreover, in order for the process to be economical, provisions must be made to recover the sulfates, while care has to be taken to attain maximum yield of the lactam during extraction as a consequence of the dilution of the lactam concentration during neutralization.

The strong exothermicity of the nitrosation reactions carried out by the conventional processes described above is also disadvantageous because of the necessity of providing means for dispersing the reaction heat, preventing hot spots from developing, and maintaining the desirable thermal conditions for the reaction.

The presence of sulfuric-acid anhydride in the reaction medium reduces the yield of caprolactam and thus the efficiency of the conversion of the cycloalkanoic acid to the ω-lactam. The low yields are the result, in part, of the formation of sulfur-containing organic byproducts whose production cannot be adequately eliminated by the conventional techniques.

It is, therefore, the principal object of the present invention to provide an improved method of producing ω-lactams wherein the aforementioned disadvantages can be avoided.

Still another object of this invention is to provide an improved method of producing ω-lactams from cycloalkanecarboxylic acids in high yield and with good conversion of the cycloalkanecarboxylic acid.

It is a further object of this invention to provide a process of the character described which involves no difficulty in maintaining the desirable reaction temperature and thermal condition.

The above objects and others which will become apparent hereinafter can be obtained, in accordance with the present invention by a method of producing ω-lactams which comprises the step of reacting a cycloalkanecarboxylic acid with nitrosyl chlorosulfonate. We have found that, surprisingly, nitrosylchlorosulfonate is an excellent substance for the nitrosation of cycloalkanecarboxylic acids and does not require free sulfur trioxide or sulfur trioxide in the form of oleum to ensure an economical reaction rate and a high yield relative to the quantity of the starting carboxylic acid. Moreover, the neutralization of the reaction mass requires only sufficient alkali to neutralize an acidity equivalent to that of the reacted carboxylic acid or nitrosyl chlorosulfonate since the products of the reaction include chlorosulfonic acid, which is formed in molar quantities equal to the consumption of nitrosyl chlorosulfonate. The excess acidity of oleum and sulfur trioxide, present in earlier processes for producing ω-lactams, is not a factor in the process of the present invention.

In addition to the fact that the reaction mass resulting from the present process is substantially smaller than the mass involved when oleum or sulfur trioxide is used, an advantage of the present invention resides in the fact that the nitrosyl chlorosulfonate and the chlorosulfonic acid formed in the course of the reaction are not nearly as active in sulfonating and fragmenting the organic starting compounds (i.e. the cycloalkanoic acid) or the solvent as is the sulfur trioxide or oleum employed heretofore. The use of nitrosyl chlorosulfonate enables the expedients heretofore proposed for the regulation of the thermal conditions of the reaction to be dispensed with. The reaction, according to the present invention, is moderately exothermic as contrasted with the high exothermicity of the earlier systems so that the reaction can be carried out even at relatively low temperatures (accompanied by a corresponding low reaction rate); the heat evolution of the reaction is, however, sufficient to ensure a continual and gradual increase in the reaction rate without a tendency to produce hotspots or the like. As indicated earlier, the quantities of alkali (i.e. alkali-metal hydroxides or carbonates or ammonium hydroxide) is substantially less because of the absence of sulfuric acid and sulfur trioxide. It is concomitantly less necessary to recover the salts produced by the neutralization reaction.

According to another feature of the present invention, the reaction is carried out by adding nitrosyl chlorosulfonate in the solid state slowly to the cycloalkane carboxylic acid which is in a liquid phase. The reaction can, however, be carried out by intimately mixing nitrosyl chlorosulfonate and the solid carboxylic acid in the solid phase although it is preferred that sufficient heat be provided either by the exothermic reaction or some other source of energy, to enable the acid to go into solution. The solvent can be the acid itself at a temperature slightly above the melting point thereof, although it is contemplated, in accordance with this invention, to dissolve the cycloalkanoic acid in an inert solvent to which the solid nitrosyl chlorosulfonate is subsequently added.

The nitrosyl chlorosulfonate can be obtained readily by reacting sulfuric anhydride (i.e. sulfur trioxide in the monomeric or polymeric state) with nitrosyl chloride in carbontetrachloride in substantially equimolar quantities. The nitrosyl chlorosulfonate can be freed from excess sulfur trioxide by any conventional technique although the use of an equimolecular ratio ensures that substantially no excess sulfur trioxide will be present. The reaction of the nitrosyl chlorosulfonate with the cycloalkanoic acid tends to go to completion because of the evolution of carbon dioxide which drives the reaction in the forward direction in spite of the formation of the chlorosulfonic acid which remains in the reaction mixture. The reaction can be represented by the formula

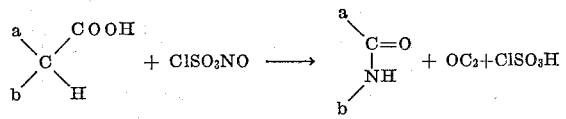

where $a$ and $b$ represent the valences of carbon atoms connected only to one additional carbon atom in a saturated straight or branched hydrocarbon chain. The monocarboxylic cycloaliphatic acid can have a ring of 4–12 carbon atoms when the carboxylic acid is represented as follows:

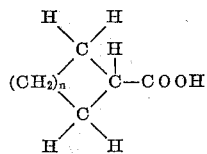

The ω-lactams will have the Formula 1 given above, in which case $n$ will be an integer ranging from 2–10. The chain $(CH_2)_n$ can, however, be branched at one or more locations with a corresponding number of hydrogen atoms replaced by alkyl groups.

It is evident, therefore, that the present invention is applicable to cycloaliphatic monocarboxylic acids such as cyclopentanoic acid, cyclohexanoic acid, cycloheptanoic acid, cyclooctanoic acid, cyclohendecanoic acid, cyclodecanoic acid and cyclododecanoic acid as well as the alkyl-substituted derivatives thereof, e.g. 4-methylcyclohexanecarboxylic acid.

Although it has been found that a wide range of molar ratios of the cycloaliphatic carboxylic acid in nitrosyl chlorosulfonate is operative, best results require a molar ratio between them of substantially 0.5 to 2, depending upon the desired conversion of the carboxylic acid. We have noted, however, that it is most desirable to operate with molar ratios of approximately unity. A reaction temperature on the order of 50° C. has been found to give best results, although the operable temperature range extends from 30°–150° C. When it is desired to carry out the reaction in liquid phase at temperatures below the melting point of the cycloalkanecarboxylic acid, inert solvents of aliphatic and cycloaliphatic hydrocarbon series can be used. Suitable solvents of this type include pentane, hexane and their cyclic counterparts such as cyclopentane and cyclohexane. Other operative solvents include chlorinated aliphatic hydrocarbons, e.g. carbon tetrachloride, dichloroethane and its homologs, and nitroparaffins such as nitromethane, nitrohexane etc.

It has been found to be preferable to carry out the reaction by adding the solid nitrosyl chlorosulfonate gradually to the cycloalkane carboxylic acid or a solution thereof in one of the inert solvents mentioned above with vigorous stirring. At the end of the reaction, the mass is cooled, e.g. by adding ice water, and treated in such manner as to separate the various components of the reaction mass. The separation of the components can be carried out by solvent extraction with, for example, ether. The ethereal extract is evaporated to recover unreacted cycloaliphatic carboxylic acid while the aqueous phase, after neutralization with an alkali, is extracted with a solvent such as benzene, chloroform or methylene chloride. Evaporation of this solvent extract yields the ω-lactam which can be purified in the conventional manner by distillation or recrystallization. Alternatively, the process can be reversed and the solvent extraction of the ω-lactam carried out on the neutralized reaction mass with the ether extraction of unreacted cycloaliphatic carboxylic acid being effected subsequently. The ω-lactams produced by this process, e.g. valerolactam, caprolactam, capryl-lactam, lauryl-lactam, etc. are excellent intermediates for the production of polyamide resins for fibers, films and molding compounds.

The invention will be more fully apparent from the following specific examples of preferred processes for the production of ω-lactams. The specific examples are given for purposes of illustration of those techniques and proportions found most advantageous and are not to be considered limiting of the broader aspects of the invention disclosed.

*Example 1*

20 grams (0.156 mole) of hexahydrobenzoic acid (i.e. cyclohexanemonocarboxylic acid) are introduced into a three-neck 250 ml. flask equipped with a mechanical stirrer, a reflux condenser and a dosimeter for gradually adding solids to the contents of the flask. Then while keeping the temperature at 55–60° C., 25 grams (0.172 mole) of nitrosyl chlorosulfonate are added to the flask over a period of 3 hrs. Stirring and heating are continued for some hours until the development of carbon dioxide (as evidenced by the discontinuance of bubble formation) has ceased. NO⁺ ion disappearance is also ascertained by means of starch-iodide paper. The reaction mass is cooled, admixed with cold water and extracted with ethyl ether.

The ethereal extract is dried on anhydrous sodium sulfate, whereupon the ether is evaporated; 2.26 grams of an oily residue are obtained, the residue containing 96.2% by weight (0.017 mole) hexahydrobenzoic acid (as determined by titration) so that an 89.2% conversion of hexahydrobenzoic acid is attained.

The residual aqueous soltuion is neutralized with 40% sodium hydroxide solution and subsequently is brought to pH 7 to 7.5 with a saturated aqueous solution of sodium bicarbonate. The aqueous phase is then repeatedly extracted with chloroform; the extracts are combined and dried on anhydrous sodium sulfate. The solvent is evaporated to obtain as residue 12.3 grams (0.109 mole) of faint yellow caprolactam with a melting point of 61–64° C.

The yield in caprolactam, based upon the reacted hexahydrobenzoic acid, is 78.2% by weight.

*Example II*

A solution of 20 grams (0.156 mole) of hexahydrobenzoic acid in 10 ml. of carbon tetrachloride is introduced into the apparatus described in Example I. 27 grams (0.186 mole) of nitrosyl chlorosulfonate are gradually added at 60° C., the reaction otherwise proceeding as in Example I. When separating the constituents of the reaction mass as set forth in Example I, 3.2 grams (0.025 mole) of hexahydrobenzoic acid and 11.9 grams (0.105 mole) of caprolactam are obtained; this corresponds to a yield of 80.1% by weight based upon the reacted hexahydrobenzoic aicd.

The hexahydrobenzoic acid conversion is 84.1% by weight.

*Example III*

A solution of 20 grams (0.128 mole) of cyclooctanecarboxylic acid in 10 ml. cyclohexane is introduced into the same equipment described in Example I. 22 grams (0.151 mole) of nitrosyl chlorosulfonate are gradually added over a period of 3.5 hrs. at 58°–60° C. Stirring and heating at 58°–60° C. are maintained for an additional 3 hrs. The reaction mixture, which is now free from NO+ ions, is cooled, admixed with cold water, neutralized with 40% sodium hydroxide solution and repeatedly extracted with chloroform.

After the extracts are dried over anhydrous sodium sulfate and the solvent evaporated, a crystalline residue of 11.7 grams (0.083 mole) of capryl-lactam is obtained, with a melting point of 73°–75° C.; this quantity corresponds to a yield of 78.6% by weight based upon the reacted cyclooctanecarboxylic acid. The residual aqueous solution is acidified with dilute sulfuric acid and repeatedly extracted with chloroform. The extracts are dried on anhydrous sodium sulfate and evaporated to yield 4 grams of a residue containing 3.5 grams (0.0224 mole) of cyclooctanecarboxylic acid (as determined by titration). The conversion of cyclooctanecarboxylic acid is of 82.5%.

*Example IV*

To a solution of 11.8 grams (0.103 mole) of cyclopentanecarboxylic acid in 10 ml. of carbon tetrachloride at 50–55° C. are gradually added to the apparatus described in Example I. Over a period of about 3 hrs., 17.7 grams (0.122 mole) of nitrosyl chlorosulfonate are added with continued stirring and heating until disappearance of NO+ ion. While operating as set forth in Example I, 5.6 grams of a brown oily residue are obtained wherefrom 4.5 grams (0.045 mole) of valerolactam are obtained by distillation, the product having a boiling point of 108–109° C./2 mm. Hg and a melting point of 38–40° C. 4.2 grams (0.0368 mole) of cyclopentanecarboxylic acid are also obtained. The conversion of cyclopentanecarboxylic acid is 64%. The valerolactam yield, based upon reacted cyclopentanecarboxylic acid, is 68.6%.

*Example V*

To a solution of 2 grams (0.099 mole) of cyclododecanecarboxylic acid in 21 ml. of cyclohexane at 57°–60° C. in the same apparatus as described in Example I, 17 grams (0.117 mole) of nitrosyl chlorosulfonate is gradually added over a period of three hours. Stirring and heating are continued for several hours. The reaction mass is cooled, admixed with cold water, neutralized to a pH of 7 to 7.5 and repeatedly extracted with chloroform. The extracts are then dried on anhydrous sodium sulfate and the solvent is evaporated. 14.4 grams (0.073 mole) of lauryl-lactam are obtained as solid white residue having a melting point of 147–149° C. The residuous aqueous solution, acidified with dilute sulfuric acid, is extracted with methylene chloride.

The extract when dried on anhydrous sodium sulfate and evaporated yields 1.9 grams (0.0089 mole) cyclododecanecarboxylic acid as a white residue. The acid conversion is 90.9% and the lauryl-lactam yield, based upon the reacted cycloalkanecarboxylic acid, is 81.1%.

*Example VI*

The method of Example I was followed except that the hexahydrobenzoic acid was replaced by an equivalent molar quantity of 4-methylcyclohexanecarboxylic acid. The results were similar to those given in Example I with the ω-lactam corresponding to the alkyl-substituted acid being produced.

*Example VII*

The method of Example III was followed except that the cyclooctanecarboxylic acid thereof was replaced by the molar equivalent of cyclohendecanoic acid. Results similar to those of Example III were obtained.

*Example VIII*

The method of Example II was followed except that the carboxylic acid of this example was replaced by the molar equivalent of cycloheptanoic acid. The results were similar to those obtained in Example II with the ω-lactam corresponding to the cycloheptanoic acid being recovered.

We claim:
1. A process for producing ω-lactams, comprising the step of reacting, in the absence of free sulfuric acid and sulfur trioxide, a cycloalkanecarboxylic acid with molecular nitrosyl chlorosulfonate having the formula $ClSO_3NO$.
2. The process as defined in claim 1 wherein said cycloalkanecarboxylic acid is in liquid phase and said nitrosyl chlorosulfonate is added as a solid to said liquid phase.
3. The process defined in claim 1 wherein said nitrosyl chlorosulfonate is intimately mixed with said cycloalkanecarboxylic acid.
4. The process defined in claim 1 wherein the reaction is carried out at a temperature ranging between substantially 30° C. and 150° C.
5. The process defined in claim 4 wherein said temperature is of the order of 50° C.
6. The process defined in claim 5 wherein said cycloalkanecarboxylic acid has a ring containing from 4 to 12 carbon atoms, inclusive.
7. The process defined in claim 6 wherein said cycloalkanecarboxylic acid is dissolved in a solvent inert with respect to nitrosation by nitrosyl chlorosulfonate.
8. The process defined in claim 7 wherein said solvent is selected from the group consisting of aliphatic catenary, cycloaliphatic and chlorinated aliphatic hydrocarbons, and nitroparaffins.
9. The process defined in claim 6 wherein the molar ratio of said cycloalkanecarboxylic acid to said nitrosyl chlorosulfonate is between substantially 0.5 and 2.
10. The process defined in claim 9 wherein said molar ratio is of the order of one.
11. The process defined in claim 9 wherein the reaction is carried out in the absence of free sulfuric acid and sulfur trioxide, further comprising the steps of extracting the reaction mixture with a solvent in which said cycloalkanecarboxylic acid is soluble but the corresponding ω-lactam is insoluble to remove unreacted cycloalkanecarboxylic acid from the reaction mixture, thereafter neutralizing the reaction mixture with a quantity of alkali substantially stoichiometrically equivalent to nitrosyl chlorosulfonate consumed in the reaction, and thereafter removing said ω-lactam from the reaction mixture by solvent extraction.
12. The process defined in claim 11 wherein the reaction mixture is neutralized and brought to a pH of substantially 7 to 7.5 prior to said solvent extraction.

13. The process defined in claim 11 wherein said cycloalkanecarboxylic acid is selected from the group consisting of cyclopentanecarboxylic acid, cyclohexanecarboxylic acid, cycloheptanecarboxylic acid, cyclooctanecarboxylic acid, cyclohendecanecarboxylic acid, cyclodecanecarboxylic acid, cyclododecanecarboxylic acid, and alkyl-substituted derivatives thereof.

14. The process defined in claim 13 wherein said alkyl-substituted derivatives include 4-methylcyclohexanecarboxylic acid.

References Cited

UNITED STATES PATENTS

| | | | |
|---|---|---|---|
| 3,022,291 | 2/1962 | Muench et al. | 260—239.3 |
| 3,114,748 | 12/1963 | Bigot et al. | 260—239.3 |
| 3,119,814 | 1/1964 | Bigot et al. | 260—239.3 |
| 3,211,722 | 10/1965 | Renckhoff et al. | 260—239.3 |

WALTER A. MODANCE, *Primary Examiner.*

ROBERT T. BOND, *Assistant Examiner.*

UNITED STATES PATENT OFFICE
CERTIFICATE OF CORRECTION

Patent No. 3,328,394            June 27, 1967

Giuseppe Ribaldone et al.

It is hereby certified that error appears in the above numbered patent requiring correction and that the said Letters Patent should read as corrected below.

In the heading to the printed specification, line 9, for "16,867/63" read -- 16,876/63 --; column 3, lines 44 to 48, for the right-hand portion of the formula reading " $+OC_2+$ " read -- $+CO_2+$ --.

Signed and sealed this 11th day of June 1968.

(SEAL)
Attest:

Edward M. Fletcher, Jr.
Attesting Officer

EDWARD J. BRENNER
Commissioner of Patents